United States Patent
Gong et al.

(10) Patent No.: US 11,397,872 B2
(45) Date of Patent: Jul. 26, 2022

(54) TECHNIQUE FOR MACHINE VISUAL LEARNING

(71) Applicant: Siemens Aktiengesellschaft, Munich (DE)

(72) Inventors: Yunye Gong, West Windsor, NY (US); Ziyan Wu, Princeton, NJ (US); Jan Ernst, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 248 days.

(21) Appl. No.: 16/636,070

(22) PCT Filed: Aug. 6, 2018

(86) PCT No.: PCT/US2018/045311
§ 371 (c)(1),
(2) Date: Feb. 3, 2020

(87) PCT Pub. No.: WO2019/032421
PCT Pub. Date: Feb. 14, 2019

(65) Prior Publication Data
US 2021/0397889 A1    Dec. 23, 2021

Related U.S. Application Data

(60) Provisional application No. 62/632,002, filed on Feb. 19, 2018, provisional application No. 62/541,936, filed on Aug. 7, 2017.

(51) Int. Cl.
*G06K 9/62*    (2022.01)
*G06F 16/51*   (2019.01)
(Continued)

(52) U.S. Cl.
CPC .......... *G06K 9/6256* (2013.01); *G06F 16/51* (2019.01); *G06N 20/00* (2019.01); *G06V 30/194* (2022.01); *G06V 40/168* (2022.01)

(58) Field of Classification Search
None
See application file for complete search history.

(56) References Cited

U.S. PATENT DOCUMENTS

| | | |
|---|---|---|
| 2009/0210363 A1 | 8/2009 | Grabarnik et al. |
| 2017/0140253 A1 | 5/2017 | Wshah et al. |

(Continued)

OTHER PUBLICATIONS

Chen et al ("InfoGAN: Interpretable Representation Learning by Information Maximizing Generative Adversarial Nets", Proceedings of the 30th International Conference on Neural Information Processing Systems (NIPS 2016), Dec. 5, 2016 (Dec. 5, 2016), pp. 2180-2188, XP055542337) (Year: 2016).*

(Continued)

*Primary Examiner* — Leon Viet Q Nguyen

(57) ABSTRACT

A method of expanding a visual learning database in a computer by teaching the computer includes providing a series of training images to the computer wherein each series includes three images with each image falling within a unique image domain and with each image domain representing a possible combination of a first attribute and a second attribute with a first image domain including the first attribute and the second attribute in a first state (X=0, Y=0), a second image domain including the first attribute in a second state and the second attribute in the first state (X=1, Y=0), and a third image domain including the first attribute in the first state and the second attribute in the second state (X=0, Y=1). The method also includes developing within the computer forward generators and reverse generators between the first image domain, the second image domain, the third image domain, and a fourth image domain for (Continued)

which no training image is provided, and applying with the computer the forward generators and reverse generators to single images that fall within one of the first image domain, the second image domain, the third image domain, and a fourth image domain to generate images for the remaining domains to populate a database.

11 Claims, 3 Drawing Sheets

(51) Int. Cl.
  *G06N 20/00* (2019.01)
  *G06V 30/194* (2022.01)
  *G06V 40/16* (2022.01)

(56) References Cited

U.S. PATENT DOCUMENTS

| | | | | |
|---|---|---|---|---|
| 2017/0351935 | A1* | 12/2017 | Liu | G06N 3/0472 |
| 2018/0314716 | A1* | 11/2018 | Kim | G06T 1/0007 |
| 2018/0365874 | A1* | 12/2018 | Hadap | G06T 5/005 |
| 2020/0151561 | A1* | 5/2020 | Kaneko | G06T 7/00 |

OTHER PUBLICATIONS

Ming-Yu, Liu et al: "Coupled Generative Adversarial Networks", 29th Conference on Neural Information Processing Systems, Barcelona, Spain, Sep. 20, 2016, Retrieved from the Internet: URL:https://arxiv.org/pdf/1606.07536.pdf [retrieved on Apr. 18, 2018], p. 1-32.

Hao Dong et al: "Unsupervised Image-to-Image Translation with Generative Adversarial Networks", arxiv.org, Cornell University Library, 201 Olin Library Cornell University Ithaca, NY 14853, Jan. 10, 2017, pp. 1-5.

Shuchang Zhou et al: "GeneGAN: Learning Object Transfiguration and Attribute Subspace from Unpaired Data", May 14, 2017, Retrieved from the Internet: URL:https://arxiv.org/pdf/105.04932.pdf [retrieved on Oct. 16, 2018], pp. 1-12.

Yongyi Lu et al: "Conditional CycleGAN for Attribute Guided Face Image Generation", arxiv.org, Cornell University Library, 201 Olin Library Cornell University Ithaca, NY 14853, May 28, 2017, pp. 1-9.

Jun-Yan Zhu et al., "Unpaired Image-to-Image Translation Using Cycle-Consistent Adversarial Networks", arxiv.org, Cornell University Library, Ithaca, NY, Mar. 30, 2017, pp. 1-18.

PCT International Search Report and Written Opinion of International Searching Authority dated Oct. 25, 2018 corresponding to PCT International Application No. PCT/US2018/045311 filed Aug. 6, 2018.

Indian Report of Examination dated Jul. 30, 2021; Application No. 202047005451; 7 pages.

* cited by examiner

TECHNIQUE FOR MACHINE VISUAL LEARNING

TECHNICAL FIELD

The present disclosure is directed, in general, to machine visual learning and more specifically to an improved technique to use machine visual learning to populate a database with otherwise unavailable images.

BACKGROUND

Using a computer to recognize an image such as a facial image or an image of an object requires that the computer be "taught" how to interpret the image. In many applications such as object detection and face recognition, a large set of training data with proper annotation is critical for the success of most deep learning-based methods. However, collecting and annotating such data can be a laborious or even fundamentally challenging job in many cases. Conventional data augmentation techniques typically involve either manual effort or simple transformation such as translation and rotation of the available data.

SUMMARY

A method of expanding a visual learning database in a computer by teaching the computer includes providing a series of training images to the computer wherein each series includes three images with each image falling within a unique image domain and with each image domain representing a possible combination of a first attribute and a second attribute with a first image domain including the first attribute and the second attribute in a first state ($X=0, Y=0$), a second image domain including the first attribute in a second state and the second attribute in the first state ($X=1, Y=0$), and a third image domain including the first attribute in the first state and the second attribute in the second state ($X=0, Y=1$). The method also includes developing within the computer forward generators and reverse generators between the first image domain, the second image domain, the third image domain, and a fourth image domain for which no training image is provided, and applying with the computer the forward generators and reverse generators to single images that fall within one of the first image domain, the second image domain, the third image domain, and a fourth image domain to generate images for the remaining domains to populate a database.

In another construction, a method of expanding an image database in a computer by teaching the computer includes providing a series of training images to the computer wherein each series includes three images with each image falling within a unique image domain and each image domain representing a possible combination of a first attribute and a second attribute with a first image domain including the first attribute and the second attribute in a first state ($X=0, Y=0$), a second image domain including the first attribute in a second state and the second attribute in the first state ($X=1, Y=0$), and a third image domain including the first attribute in the first state and the second attribute in the second state ($X=0, Y=1$). The method also includes generating a fourth image domain including the first attribute in the second state and the second attribute in the second state ($X=1, Y=1$), developing a first forward generator (G1) that transitions the first attribute from the first state to the second state, and developing a second forward generator (G2) that transitions the second attribute from the first state to the second state. The method further includes developing a first reverse generator (F1) that transitions the first attribute from the second state to the first state, developing a second reverse generator (F2) that transitions the second attribute from the second state to the first state, optimizing the first forward generator, the second forward generator, the first reverse generator, and the second reverse generator using a plurality of series of training images, and applying with the computer the first forward generator, the second forward generator, the first reverse generator, and the second reverse generator to single images that fall within one of the first image domain, the second image domain, the third image domain, and a fourth image domain to generate images for the remaining domains to populate a database.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
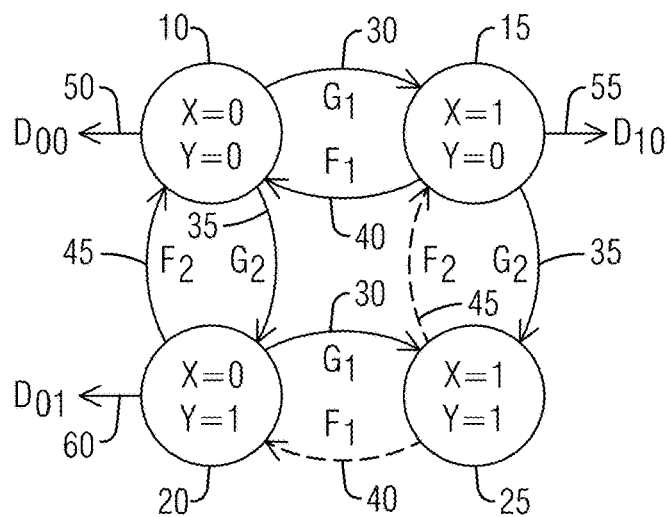
FIG. 1 is a graphical representation of a multi-concept learning system in which the number of concepts equals two (n=2).

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout.

The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

Compositionality of semantic concepts in image synthesis and analysis is appealing as it can help in decomposing known and generatively recomposing unknown data. For instance, we may learn concepts of changing illumination, geometry or albedo of a scene, and try to recombine them to generate physically meaningful, but unseen data for training and testing. In practice however, samples from the joint concept space are often unavailable. Data on illumination change may be available in one data set and on geometric change in another one without complete overlap (i.e., the joint concept space). Using cyclic consistency over multiple concepts, represented individually by generative adversarial networks (GANs). The method described herein, sometimes referred to as ConceptGAN can be understood as a drop in for data augmentation to improve resilience for real world applications to learn two or more concepts jointly from different data sets with mutual consistency without samples from the full joint concept space. Qualitative and quantitative evaluations demonstrate its efficacy in generating semantically meaningful images, as well as one shot face verification as an example application.

In applications such as object detection and face recognition, a large set of training data with accurate annotation is critical for the success of modern deep learning-based methods. Collecting and annotating such data can be a laborious or even an impossible task. Starting with the limitation of learning one concept at a time, one would like to continue learning more concepts to generate a wider variety of data. However, samples from the joint distribution may not be available for training. For example, with regard to facial recognition, concepts to be learned may include facial expressions, presence or absence of facial hair, hair style, hair color, hats, glasses, etc. Going beyond two concepts, the joint concept space becomes exponential and unfeasible for gathering data (i.e., images of the same person with all the possible varying concepts).

In addition, it is difficult to directly compose separately trained mappings in a meaningful way to synthesize plausible images in the domains where no training data is available. For example, shape-varying mappings trained with color images may fail to translate images in the line drawing domain.

To address these problems, the present invention regularizes the learning of the individual concepts by enforcing consistency of concept composition. As illustrated in FIG. 1, cyclic consistency and their corresponding inverses are enforced over multiple closed paths to assure a cycle of four concept shifts.

FIG. 1 represents one possible example in which multiple concepts (referred to generally as "X" and "Y") are learned simultaneously to develop data that is otherwise unavailable. The newly developed data can be used to complete a database or can be used for other purposes. In FIG. 1, each of four corner elements represents a domain 10, 15, 20, 25. Each domain 10, 15, 20, 25 is an image or piece of data that includes one or more concepts (X, Y). A concept (X, Y) is simply an attribute of the image or piece of data. For purposes of discussion an example of a facial image will be used throughout the description. In the example, two concepts (X, Y) will be learned with the first concept (X) being "no smile" or "a smile" and the second concept (Y) being "no glasses" or "with glasses". In FIG. 1, the concepts are labeled X and Y with the values of X=0 representing no smile, X=1 representing a smile, Y=0 representing no glasses, and Y=1 representing glasses. The first domain 10 (X=0, Y=0) represents a facial image in which there is no smile and no glasses. The second domain 15 (X=1, Y=0) represents a facial image in which there is a smile and no glasses. The third domain 20 (X=0, Y=1) represents a facial image in which there is no smile but there are glasses. In the example of FIG. 1, the first three domains 10, 15, 20 include available data. The fourth domain 25 (X=1, Y=1) represents a facial image in which there is a smile and there are glasses. The fourth domain 25 includes data that is not available, but rather is generated as will be described in greater detail.

With continued reference to FIG. 1, four generators 30, 35, 40, 45 are employed to generate data. The four generators include a first generator 30 ($G_1$) that starts with an image with a first concept value of X=0 and generates a new image where X=1. A second generator 35 ($G_2$) starts with an image with a second concept value of Y=0 and generates a new image where Y=1. A third generator 40 ($F_1$) starts with an image with a first concept value of X=1 and generates a new image where X=0. This is essentially the reverse of the first generator 30. A fourth generator 45 ($F_2$) starts with an image with a second concept value of Y=1 and generates a new image where Y=0. As with the third generator 40, the fourth generator 45 is essentially the reverse of the second generator 35. With the four generators 30, 35, 40, 45, the computer is able to generate images in any domain 10, 15, 20, 25 based on a single image from one of the domains 10, 15, 20, 25.

However, the generators 30, 35, 40, 45 must be "learned" or developed to produce accurate and meaningful results. To complete the learning process, the system includes three discriminators 50, 55, 60 associated with the domains 10, 15, 20 for which known data exists. The first discriminator 50 is associated with the first domain 10 in which both X and Y equal zero ($D_{00}$). The second discriminator 55 is associated with the second domain 15 in which X=1 and Y=0 ($D_{10}$). The third discriminator 60 is associated with the third domain 20 in which X=0 and Y=1 ($D_{01}$). Each discriminator 50, 55, 60 operates to analyze images to determine if the image is a real image or if it was generated using one of the four generators 30, 35, 40, 45. Using an iterative or cyclic process, the generators 30, 35, 40, 45 are adjusted until the discriminators 50, 55, 60 can no longer determine which images are generated by the generators 30, 35, 40, 45 and which images are actual data. At this point, the generators 30, 35, 40, 45 have been optimized and the discriminators 50, 55, 60 can be discarded.

As noted, the first three domains 10, 15, 20 in this example contain known or available data. In this example, celebrity photos containing the necessary data are readily available. This known data is used to develop the four generators 30, 35, 40, 45 using the discriminators 50, 55, 60. Once the four generators 30, 35, 40, 45 are completed, the discriminators 50, 55, 60 are no longer needed, and any domain image can be used to generate the remaining three domains 30, 35, 40, 45, thereby allowing for the population of a database with only minimal starting data.

Figure 3:
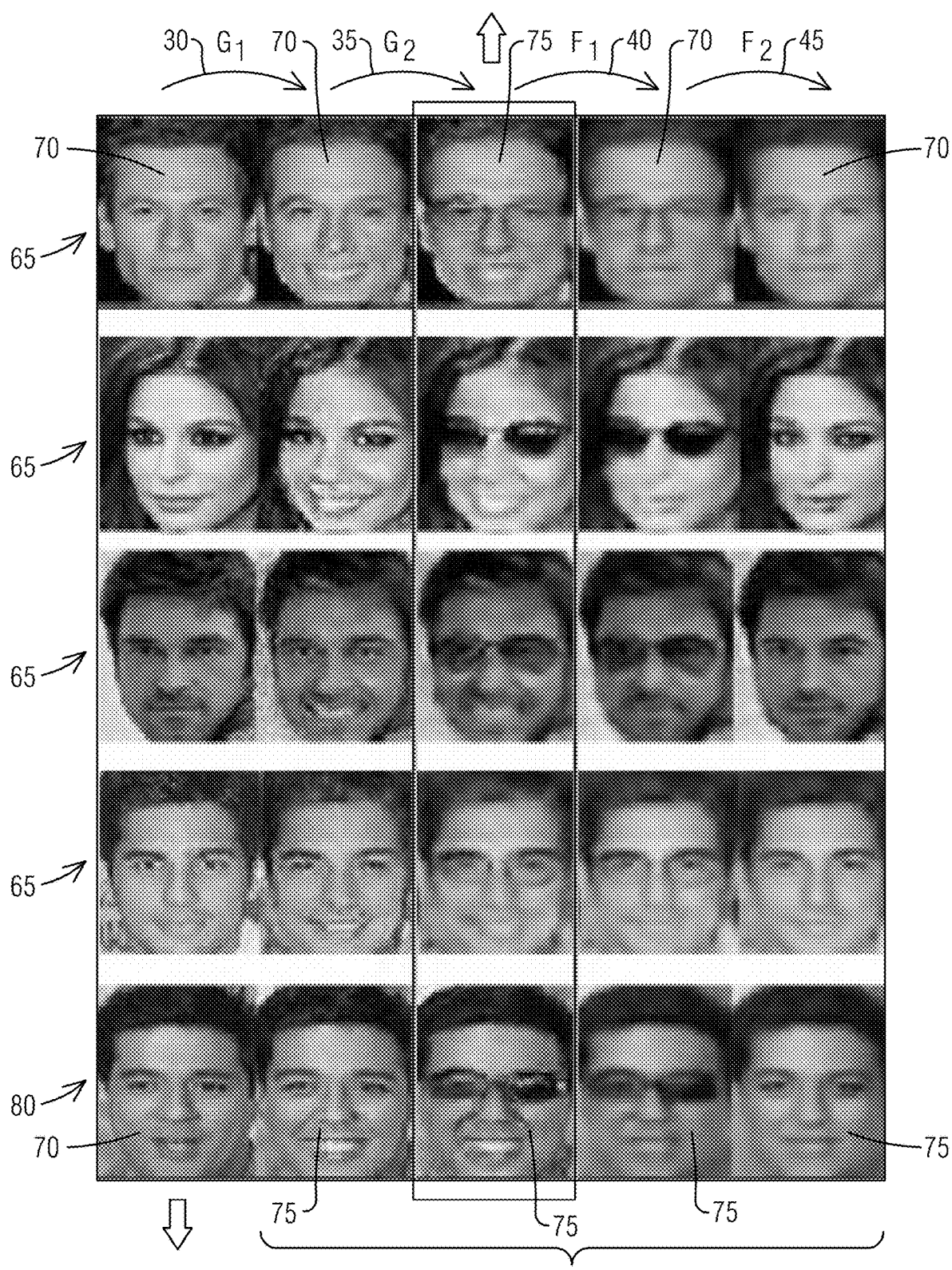
FIG. 3 is a partial showing of data used to train the learning system of FIG. 1.

FIG. 3 illustrates sample data that can be used to optimize the generators 30, 35, 40, 45. The first four rows 6 include four available images 70 (the first two and the last two) representing the four domains 30, 35, 40, 45 for two concepts (X, Y) to be learned and one unavailable image 75 (the middle image) which represents the joint concept space (i.e., X=1, Y-1). These first four rows 65 are used to create and optimize the generators 30, 35, 40, 45 between the four domains 10, 15, 20, 25. The final row 80 in FIG. 3 includes a single available image 70 (the first image) and four synthetic or generated images 75.

Figure 2:
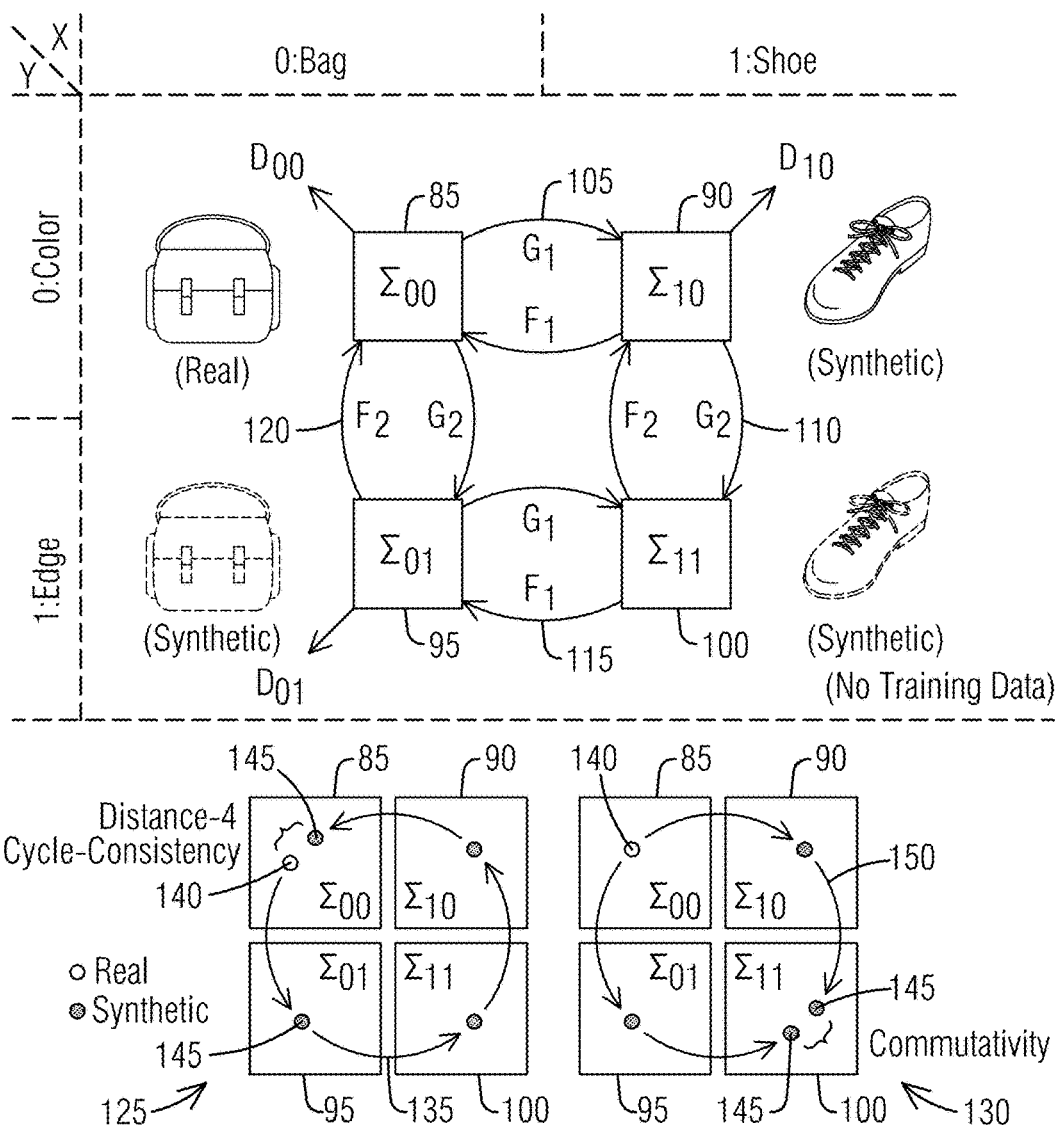
FIG. 2 is a graphical representation of a multi-concept learning system for two different concepts than those of FIG. 1.

FIG. 2 illustrates another example in which the concepts (X, Y) are unrelated to a face and rather relate to a type of object (i.e., a bag or a shoe) and texture of the image (i.e., a color image represented as solid lines, or a line drawing represented by broken lines). The same technique and process described with regard to FIG. 1 is applied to the domains 85, 90, 95, 100 of FIG. 2 to develop the four generators 105, 110, 115, 120 and allow for the population of a database or the generation of additional domain data. Given sufficient training data, translation from an image of a textured handbag 85 to a corresponding visually convincing image of a shoe with the same texture 90, or from a color image of a handbag 85 to a consistent line drawing of a handbag 95 is possible.

FIG. 2 also includes a pair of charts 125, 130 that illustrate the cyclic consistency that is enforced to achieve the desired results. During the development of the generators 105, 110, 115, 120 and after they are complete, two general forms of cyclic consistency are enforced. The first cyclic consistency 135 requires starting with one image 140 in a domain 85, 90, 95, 100 (can start at any domain 85, 90, 95, 100) and using the generators 105, 110, 115, 120 to create images 145 in the other domains 85, 90, 95, 100 moving in a circle (clockwise or counterclockwise) including the domain 85, 90, 95, 100 in which the process started. In that starting domain 85, 90, 95, 100, the original image 140 and the synthetic image 145 should be so similar that the discriminators 50, 55, 60 cannot tell which image 140, 145 is synthetic. The second form of cyclic consistency 150 starts with an actual image 140 in one of the domains 85, 90, 95, 100. Synthetic images 145 are generated in each of the adjacent domains 85, 90, 95, 100 and then two different synthetic images 145 are generated for the opposite domain 85, 90, 95, 100. Thus, a synthetic image 145 is generated for the domain 85, 90, 95, 100 opposite the starting domain 85, 90, 95, 100 from both the clockwise and counterclockwise directions. These two images 145 should be so similar that the discriminators 50, 55, 60 cannot distinguish them from one another or from the real images 140.

Figure 4:
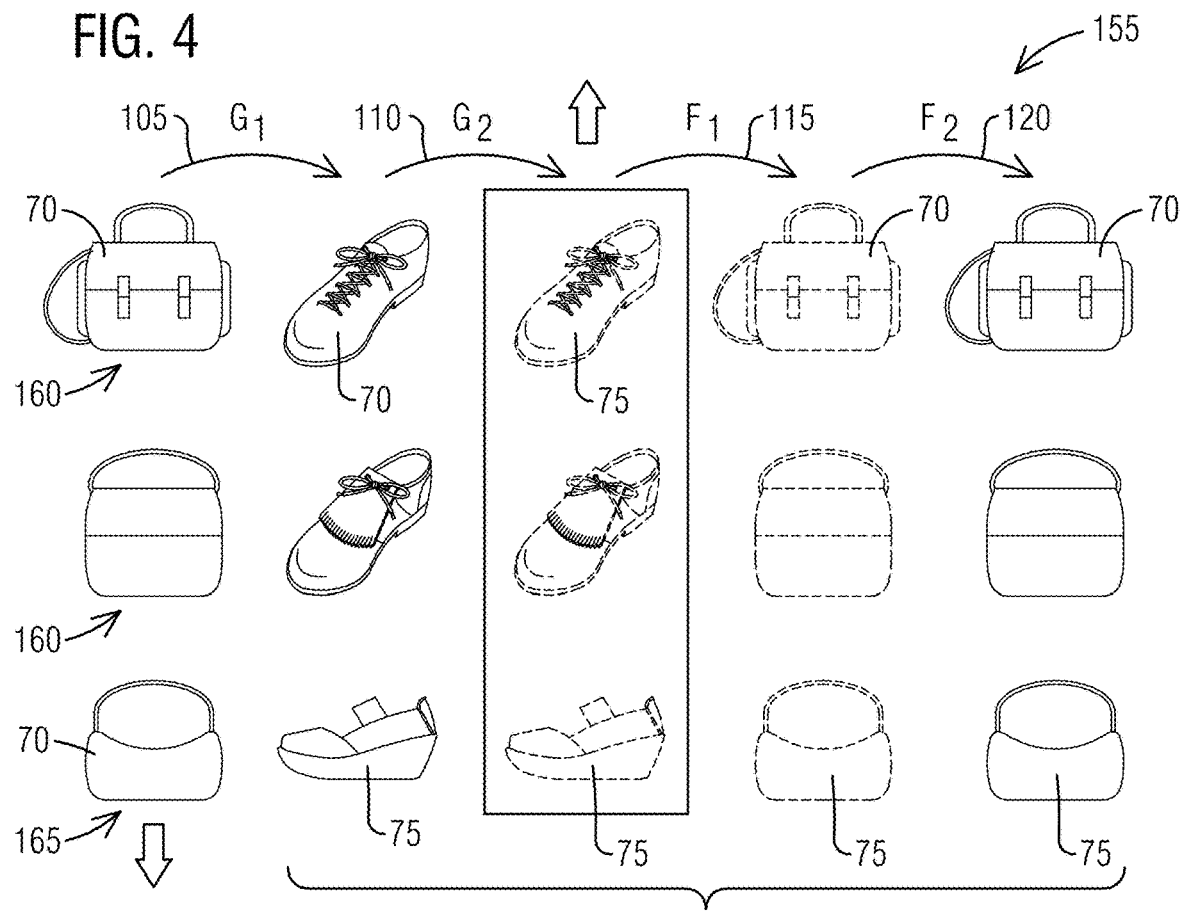
FIG. 4 is a partial showing of data used to train the learning system of FIG. 2.

FIG. 4 illustrates another set of sample data 155 that could be used to develop the generators 105, 110, 115, 120 of the example of FIG. 2. In FIG. 4, the first two rows 160 of data include sample data for which four of the five images are available images 70. The final row 165 includes data for which a single image is an available image 70 and the remaining four images are synthetic or generated images 75. It is important to note that significantly more sample data than two or three rows is required to complete the generators 105, 110, 115, 120. Thus, the example data herein, describes a small portion of the necessary data.

Figure 5:
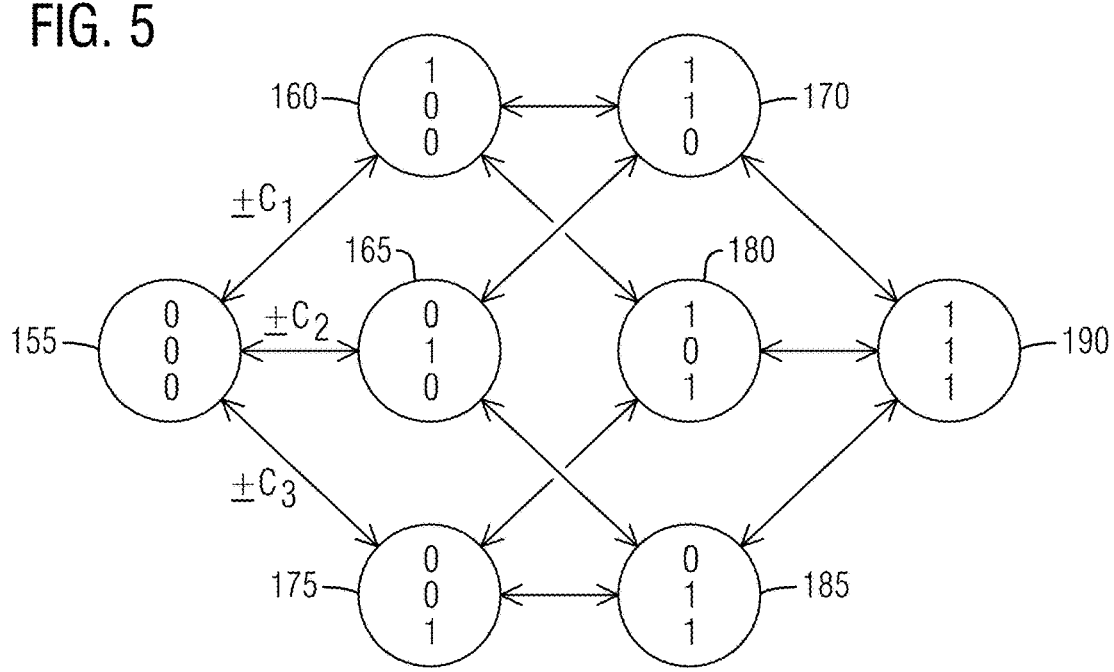
FIG. 5 is a graphical representation of a multi-concept learning system in which the number of concepts equals three (n=3).

While the foregoing examples describe learning two concepts (X, Y) simultaneously, FIG. 5 schematically illustrates how three concepts (X, Y, Z) could be learned simultaneously. When three concepts are involved, eight different nodes or domains 155, 160, 165, 170, 175, 180, 185, 190 will exist. The domains 155, 160, 165, 170, 175, 180, 185, 190 include a first set of domains 155, 160, 165, 170 that are the same as those of the example of FIG. 1 with a third concept, Z equal to zero and another set of domains 175, 180, 185, 190 that are the same as those of the example of FIG. 1 with the third concept, Z equal to one.

The same process is used with three concepts with cyclic consistency maintained in both directions for four loops rather than one loop as with the example of FIG. 1. In addition, twelve generators need to be created and optimized in this example using four discriminators. As one or ordinary skill will realize, additional concepts could be learned simultaneously but as is clear, the level of complexity increases rapidly.

While not strictly necessary, it is assumed that the application of concepts is commutative, yielding a set of symmetric cycle consistency constraints. As it is notoriously difficult to gauge the performance of novel image synthesis, a surrogate task such as face verification is used for performance evaluation and to demonstrate how a black-box baseline system can be improved by data augmentation. Using joint learning, transfer and composition of concepts, semantically meaningful image synthesis can be achieved over a joint latent space with incomplete data, for instance from a domain where no data is available at training time. A scalable framework is provided for efficient data augmentation where multiple concepts learned in a pair-wise fashion can be directly composed in image synthesis. Using face verification as a surrogate problem, the proposed method can be used as a framework to perform conditional image synthesis, helping improve face verification accuracy.

ConceptGAN is a concept learning framework aimed at recovering the joint space information given missing training data in one domain. As illustrated in FIG. 1 the basic unit of the framework is modeled as a four-vertex cyclic graph, where a pair of latent concepts (X, Y) is jointly learned. No pairwise correspondence is required for data samples between any two domains 10, 15, 20, 25 and it is possible to generate realistic synthetic samples over all four domains 10, 15, 20, 25 under the assumption that no training samples are available in one of the domains.

A pairwise cycle-consistency loss is proposed to encourage generators to learn bidirectional mappings between two distributions. Both forward cycle-consistency and backward cycle-consistency between pairs and only forward cycle-consistency between pairs (01;11) and (10;11). Such consistency constraints can naturally be extended to potentially any closed walks in the cyclic graph and thus further reduce the space of possible mappings. In particular, the difference between training data samples and image samples reconstructed via walking through all four domains 10, 15, 20, 25 from either direction is minimized. For example, for any data sample in the first domain 10, a distance-4 cycle consistency constraint 125 is defined in the clockwise direction and in the counterclockwise direction (see FIG. 2).

Adversarial training learns mappings that capture sample distributions of training data and therefore are not easily transferable to input data that follows a different distribution without a second training, which may lead to weak compositionality. To encourage the model to capture semantic shifts, which correspond to commutative operators such as addition and subtraction in latent space, a commutative property for concept composition is enforced such that starting from one data sample, similar outputs are expected after applying concepts in different orders.

For all discriminators 50, 55, 60, an architecture which contains five convolution layers with 4×4 filters is used. The discriminator network takes 64×64 input images and output a scalar from the sigmoid function for each image. For all the generators 30, 35, 40, 45, 10, 110, 115, 120, the architecture contains two convolution layers with stride two, six residual blocks and two fractionally strided convolution layers with stride one-half. A learner with an initial learning rate of 0.0002 at the first 150 epochs, followed by a linearly decaying learning rate for the next 150 epochs as the rate goes to zero is used. For the experiments described below, $\mu=\lambda=10$ and an identity loss component with weight ten are used.

Concept learning with face images (FIGS. 1 and 3) show the results of applying the proposed method on face images. In the experiment concerning the concepts "smile" and "eyeglasses" (FIG. 3), the sample data includes 4851 images with attribute labels (no smile, no eyeglasses), 3945 images (no smile, with eyeglasses), and 4618 images (with smile, no eyeglasses).

FIG. 5 presents the results of directly composing three concepts (X, Y, Z) learned in two separate experiments described above. Synthetic images are generated in the domain with labels (with smile, with eyeglasses, with bangs, i.e. X=1, Y=1, Z=1) where no training data is available in either experiment. It is clear that the proposed method can be generalized to manipulation over higher dimensional latent spaces.

It should also be clear that learned concepts (X, Y, Z) are readily transferable to different datasets, including datasets that were not used during the training or learning phase.

Given a pair of face images, face verification is the problem of determining whether the pair represents the same person. To apply the present method, a user begins with the one-shot version where every person in the probe and the gallery has exactly one image each. The learned concept mappings are then applied to synthesize new, unseen face images, transforming the one-shot version to multi-shot images. By performing this conversion with the synthesized images, the face verification performance is improved. The focus of these evaluations is not to obtain state-of-the-art results but to demonstrate the applicability of ConceptGAN as a plug-in module that can be used in conjunction with any existing face verification algorithm to obtain improved performance.

Converting the one-shot face verification problem to a multi-shot one by means of ConceptGAN has obvious benefits, with the multi-shot face verification results consistently outperforming the corresponding one-shot results. These results, complemented by qualitative evaluations, provide evidence for the transferability of the learned concepts to new datasets, demonstrating promise in learning the underlying latent space information.

As discussed with regard to FIG. 5, it is possible to scale up to three (or more) concepts. In fact, the foregoing method can be applied to "n" concepts under two assumptions, first the concepts must have distinct states, i.e. they are not continuous, and second, activating one concept cannot inhibit the other. Pairwise constraints over two concepts are sufficient for generating samplers from all concept combinations. FIG. 5 illustrates and example with n=3. As with the n=2 examples, each domain may include available data or data that must be generated. Generalizing to n>3, new layers of domains are added in order of their distance from any observed domain.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of expanding a visual learning database in a computer by teaching the computer, the method comprising:
    providing a series of training images to the computer wherein the series includes sets of three images with each image falling within a unique image domain and each image domain representing a possible combination of a first attribute and a second attribute with a first image domain including the first attribute and the second attribute in a first state (X=0, Y=0), a second image domain including the first attribute in a second state and the second attribute in the first state (X=1, Y=0), and a third image domain including the first attribute in the first state and the second attribute in the second state (X=0, Y=1);

developing within the computer forward generators and reverse generators between the first image domain, the second image domain, the third image domain, and a fourth image domain for which no training image is provided; and applying with the computer the forward generators and reverse generators to single images that fall within one of the first image domain, the second image domain, the third image domain, and a fourth image domain to generate images for the remaining domains to populate a database, wherein the developing step includes using a first forward generator to generate an image from the first image domain that falls within the second image domain, using a second forward generator to generate an image from the second image domain that falls within the fourth image domain, using a first reverse generator to generate an image from the fourth image domain that falls within the third image domain, and using a second reverse generator to generate an image from the third image domain that falls within the first image domain, the method further comprising determining which of the generated images appear false and adjusting the respective generator in response to the detection of the false image.

2. The method of claim 1, comprising determining if the generated images are false images using discriminators.

3. The method of claim 1, wherein the developing step includes using the second forward generator to generate an image from the first image domain that falls within the third image domain, using the first forward generator to generate an image from the third image domain that falls within the fourth image domain, using the first reverse generator to generate an image from the fourth image domain that falls within the second image domain, and using the second reverse generator to generate an image from the second image domain that falls within the first image domain, the method further comprising determining which of the generated images appear false and adjusting the respective generator in response to the detection of the false image.

4. The method of claim 1, further comprising providing a plurality of series of images for training, wherein each series is used to further optimize the forward generators and reverse generators.

5. The method of claim 1, wherein the images include faces and wherein the first attribute has a first state of no smile and a second state including a smile.

6. The method of claim 5, wherein the second attribute has a first state of no glasses and a second state including glasses.

7. A method of expanding an image database in a computer by teaching the computer, the method comprising:

providing a series of training images to the computer wherein the series includes sets of three images with each image falling within a unique image domain and each image domain representing a possible combination of a first attribute and a second attribute with a first image domain including the first attribute and the second attribute in a first state (X=0, Y=0), a second image domain including the first attribute in a second state and the second attribute in the first state (X=1, Y=0), and a third image domain including the first attribute in the first state and the second attribute in the second state (X=0, Y=1);

generating a fourth image domain including the first attribute in the second state and the second attribute in the second state (X=1, Y=1);

developing a first forward generator ($G_1$) that transitions the first attribute from the first state to the second state;

developing a second forward generator ($G_2$) that transitions the second attribute from the first state to the second state;

developing a first reverse generator ($F_1$) that transitions the first attribute from the second state to the first state;

developing a second reverse generator ($F_2$) that transitions the second attribute from the second state to the first state;

optimizing the first forward generator, the second forward generator, the first reverse generator, and the second reverse generator using a plurality of series of training images; and applying with the computer the first forward generator, the second forward generator, the first reverse generator, and the second reverse generator to single images that fall within one of the first image domain, the second image domain, the third image domain, and a fourth image domain to generate images for the remaining domains to populate a database, wherein the developing steps include using a first forward generator to generate an image from the first image domain that falls within the second image domain, using a second forward generator to generate an image from the second image domain that falls within the fourth image domain, using a first reverse generator to generate an image from the fourth image domain that falls within the third image domain, and using a second reverse generator to generate an image from the third image domain that falls within the first image domain, the method further comprising determining which of the generated images appear false and adjusting the respective generator in response to the detection of the false image.

8. The method of claim 7, comprising determining if the generated images are false images using discriminators.

9. The method of claim 7, wherein the developing steps include using the second forward generator to generate an image from the first image domain that falls within the third image domain, using the first forward generator to generate an image from the third image domain that falls within the fourth image domain, using the first reverse generator to generate an image from the fourth image domain that falls within the second image domain, and using the second reverse generator to generate an image from the second image domain that falls within the first image domain, the method further comprising determining which of the generated images appear false and adjusting the respective generator in response to the detection of the false image.

10. The method of claim 7, wherein the images include faces and wherein the first attribute has a first state of no smile and a second state including a smile.

11. The method of claim 10, wherein the second attribute has a first state of no glasses and a second state including glasses.

* * * * *